Feb. 23, 1954 W. A. BIERMANN ET AL 2,670,005
LIQUID FLOW CONTROL
Filed Oct. 28, 1950 3 Sheets-Sheet 1

INVENTOR.
WILLIAM A. BIERMANN
BY ROBERT W. SLOANE
ATTORNEY

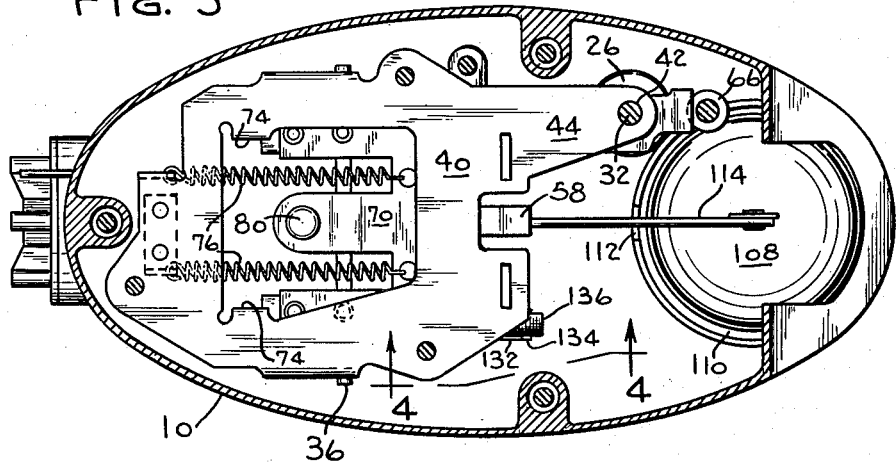
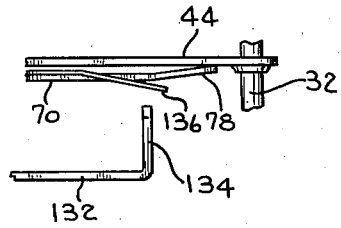
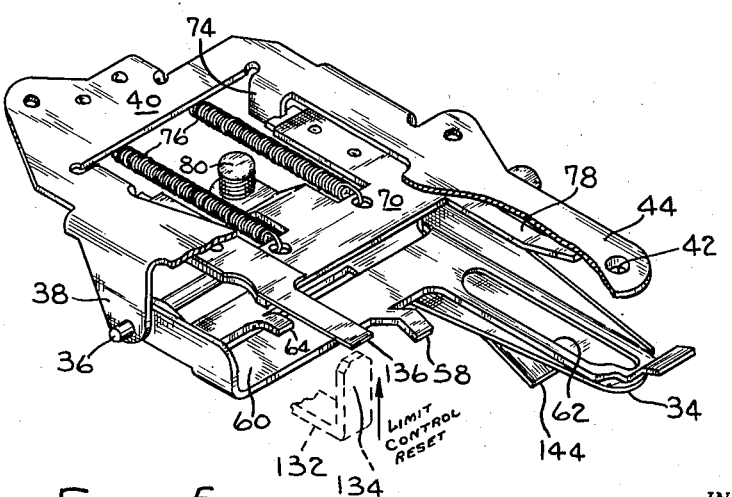

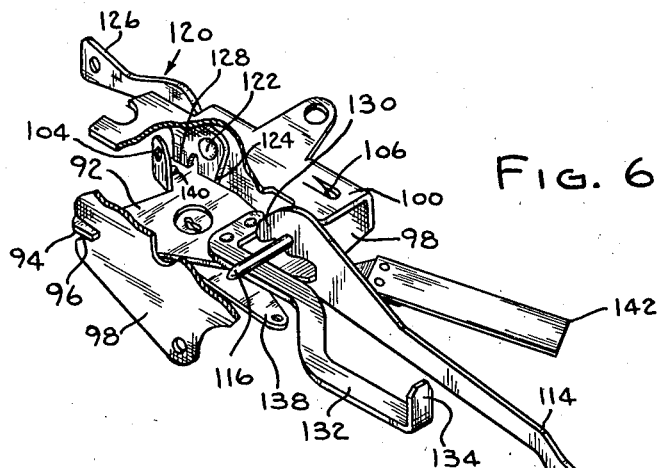
FIG. 6
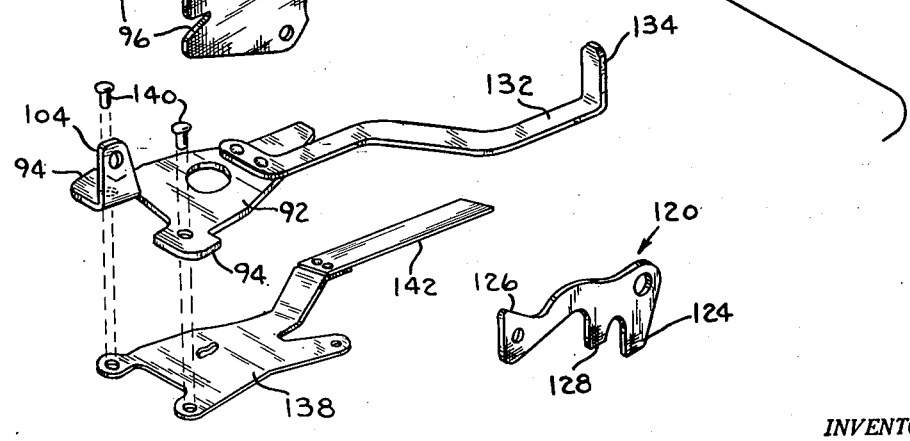
FIG. 7
INVENTOR.
WILLIAM A. BIERMANN
BY ROBERT W. SLOANE
ATTORNEY Patented Feb. 23, 1954

2,670,005

UNITED STATES PATENT OFFICE 2,670,005

LIQUID FLOW CONTROL

William A. Biermann and Robert W. Sloane, Milwaukee, Wis., assignors to A P Controls Corporation, a corporation of Wisconsin Application October 28, 1950, Serial No. 192,786

3 Claims. (Cl. 137—389)

This invention relates to oil controls of the type employed with pot-type burners. More particularly this invention relates to a constant level oil control provided with a limit control operable to close both the inlet and outlet valves and adapted to be reset by means of the same device which releases or resets the inlet valve striker.

Constant level oil control valves are generally mounted within the casing of a furnace where they are concealed from view. The various operating arms, etc. are remotely controlled from the furnace exterior by means of rods, push-pull cables, and the like. It is highly desirable to reduce the number of such rods, etc. to a minimum to simplify installation and operation.

The present control provides for resetting the limit control by means of the same apparatus employed to reset the striker, thus eliminating one control rod. In addition to simplifying the installation, the number of controls is reduced to the point where one is manipulated in the event of current failure and the other when either of the safety devices has functioned.

The present control fails safe when the limit control fails. In normal operation the limit control closes the outlet valve when the furnace bonnet temperature exceeds the safe limit, as usual. The growing demand of the control industry for electrically ignited burners makes a limit control capable of closing both valves highly desirable. With this in mind the present limit control closes the inlet valve as well as the outlet valve. Closure of the inlet valve is also provided when the outlet valve is closed by manual or thermostatic means.

An object of this invention is to provide an extremely safe fuel control which is simple to operate.

Another object is to provide a fuel oil control in which the striker and the limit control may be reset by operation of a single exterior control.

A further object is to provide a fuel oil control wherein the inlet valve is closed whenever the outlet valve is closed.

Other objects and advantages will be pointed out in, or be apparent from, the specification and claims, as will obvious modifications of the single embodiment shown in the drawings, in which:

Fig. 3 is a horizontal section taken on line 3—3 on Fig. 1;

Fig. 4 is a fragmentary view taken as indicated by line 4—4 on Fig. 3;

Fig. 5 is a perspective view, with parts broken away, showing the toggle acting limit control lever and the outlet valve operating leverage;

Fig. 6 is a perspective view, with parts broken away, showing the striker, the striker and limit control reset mechanism, and the leverage for closing the inlet valve when the outlet valve is closed; and Fig. 7 is an exploded perspective view of the structure shown in Fig. 6.

Figure 1:
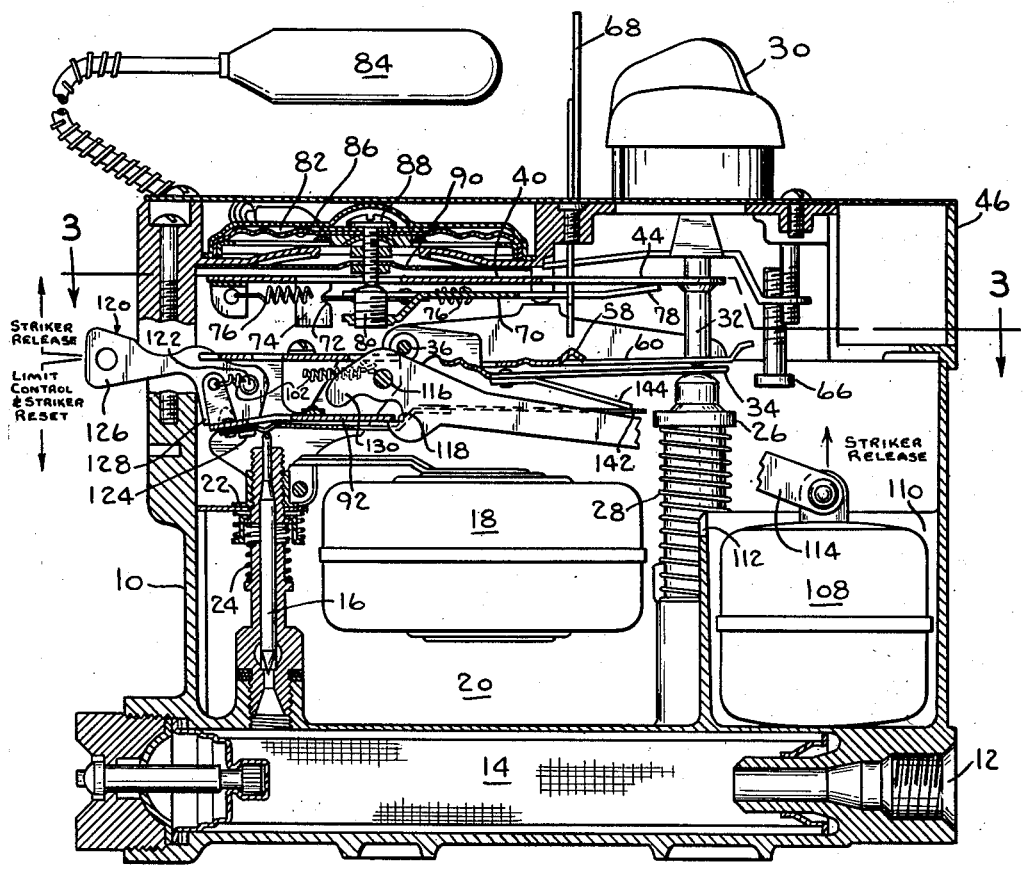
Fig. 1 is a vertical section of a manually operated oil control valve embodying the present invention.

Referring to the drawings in detail, oil flows into casing 10 through inlet 12, strainer 14 and inlet valve 16 regulated by float 18 to maintain a constant level in chamber 20. The float acts on valve shoulder 22 to close the valve against the bias of spring 24 as the level in chamber 20 increases. Flow from chamber 20 to the burner (not shown) is regulated by means of outlet valve 26 urged toward its open position by spring 28 and regulated by manual or thermostatic means. When regulated manually, knob 30 is rotated to raise or lower pin 32 acting on outlet valve 26 through the medium of lever 34 pivotally mounted on pin 36 carried by ears 38 depending from bracket 40. Extension 44 of bracket 40 is provided with hole 42 which guides pin 32.

Figure 2:
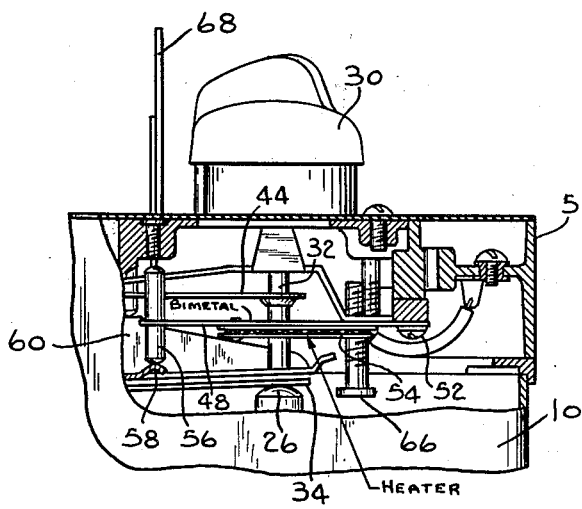
Fig. 2 is a fragmentary view, partly in section, of the control valve shown in Fig. 1 adapted for thermostatic regulation.

When the control is to be thermostatically regulated, end plate 46 (Fig. 1) is removed from the upper right-hand corner of the casing to permit insertion of a bimetallic valve operator in the space thus provided. This operator comprises a bimetal 48 (Fig. 2) mounted on Bakelite base 50 by means of screws 52. Bimetal heater 54 on the underside of the bimetal is suitably wired for connection to a room thermostat which closes the heater circuit when there is a demand for heat. An actuating pin 56 on the end of the bimetal bears on boss 58 of lever 60 which overlies lever 34 and is provided with a longitudinal slot 62 permitting the manual valve operating pin 32 to bear directly on lever 34. It will be noted that lever 34 is provided with an ear 64 which projects over lever 60 to loosely interconnect the levers and permit downward movement of lever 34 even though the end of lever 60 may be in contact with the low limit screw 66. When cool the bimetal acts on boss 58 to close the outlet valve by moving lever 60 down on lever 34. When the thermostat calls for heat the bimetal warps upwardly permitting the outlet valve spring 28 to open the valve while raising levers 34 and 60. Should there be a current failure, the bimetal fails safe. If desired, the control may be operated manually under such conditions by raising handle 68 to catch the end of the bimetal in a depending hook and lift it to an inoperative position against its inherent resiliency.

A toggle acting lever 70 is held in notches 72 in ears 74 depending from bracket 40 by means of a pair of tensioned springs 76, 76. Normally, springs 76, 76 hold toggle lever 70 in the inoperative position shown in Fig. 1 wherein the extension arm 78 of lever 70 is biased counter-clockwise into contact with the underside of the guide arm 44. A suitable force applied to pressure boss 80 will throw toggle lever 70 overcenter to snap arm 78 downwardly through slot 62 in lever 60 onto the upper surface of lever 34 and punch the outlet valve closed. The force necessary to punch the toggle lever 70 overcenter is derived from the limit control which includes a charged chamber 82 and feeler bulb 84 mounted in the bonnet of the furnace. When the bonnet temperature exceeds the safe limit, the pressure in chamber 82 throws diaphragm 86 and moves diaphragm screw 88 downwardly on pad 80 to throw the toggle. It is to be noted that a leaf spring 90 also bears on screw 88 and biases the screw downwardly so the limit control will snap down and fail safe in the event the diaphragm feeler bulb or capillary tube connecting the tube to the diaphragm chamber should develop a leak.

Further details of the mechanism described above may be seen in the Pawelsky et al. Patent No. 2,506,937.

Striker plate 92 is provided with laterally projecting ears 94 which fit into cooperating notches 96 in skirts 98 depending from bracket 100. The striker is held in the notches and biased in a clockwise direction by means of spring 102 connected between ear 104 struck upwardly from the striker plate and ear 106 struck downwardly from the top of bracket 100. Auxiliary float 108 in chamber 110 rises when the oil level in chamber 20 overflows dam 112. When float 108 rises, it lifts the right-hand end of arm 114 pivoted on pin 116 in bracket 100 and provided with jaw 118 normally retaining striker plate 92 in an inoperative position. This movement withdraws jaws 118 from the striker and spring 102 snaps the striker downwardly to close the inlet valve. Bell crank 120 is pivotally mounted on a pin 122 on the inside of one of the bracket skirts 98 adjacent the spring with an arm 124 projecting downwardly between the striker plate and the skirt. The actuating arm 126 projects through a cooperating slot in the casing 10 and depending finger 128 bears on the top of the striker forwardly of the notch in the bracket skirt. When actuating arm 126 is depressed, finger 128 bears on the striker plate to exert a force moving the striker plate in a counter-clockwise direction about the pivotal axis determined by the notched connection between the striker and the depending skirts. Assuming the striker has been released by overflow into chamber 110, the striker plate will be moved upwardly to bear against the nose 130 of arm 114 to swing the arm in a clockwise direction and push float 108 down while expelling the oil from chamber 110 and permitting jaw 118 to move back into position to engage the striker and hold the striker in its inoperative position. If desired the striker may be released by raising actuating arm 126 to cause depending arm 124 to move the adjacent striker lug 94 out of notch 96 in skirt 98 and pivot the striker in a horizontal plane about an axis determined by the connection between the striker and the other notch. This crabwise movement of the striker moves the tip of the striker out of jaw 118 and allows spring 102 to snap the striker downwardly.

Arm 132 is riveted to striker 92 and projects outwardly and laterally from the striker so the up-turned end 134 of the arm underlies resilient strip 136 fixed on and projecting from toggle lever 70. Normally the up-turned arm portion 134 does not contact the resilient strip 136. If the limit control should operate to throw toggle lever 70 overcenter, the resilient strip is moved downwardly into contact with the tip of arm 132. Since arm 132 is mounted on striker 92, it will swing upwardly to swing the resilient strip and the toggle lever back overcenter when reset arm 126 is depressed. Thus the limit control may be reset by means of the striker reset arm. If both the striker and the limit control should require resetting the striker is reset first. The resilient strip 136 on the toggle lever cushions the action and introduces "feel" to the resetting operation. In addition to doing away with the usual limit control remote reset rod extending through the side wall of the furnace, this simplifies the operation since one control may now be actuated to place the furnace back in operation without the operator being required to determine which safety device has operated.

Referring back to the striker, it will be noted that plate 138 is loosely connected to the underside of the striker by means of rivets 140, 140. The loose connection permits plate 138 to move relative to striker 92 in a pivotal manner. The plate 138 rests on the top of the inlet valve stem and is provided with a resilient extension 142 which underlies a brass strip 144 mounted on valve operating lever 34. This brass strip may be bent readily, thus permitting adjustment of the interconnection between lever 34 and the inlet valve to close the inlet valve when the outlet valve is closed by means of the manual control knob 30 or the bimetallic operator 48 or the limit control. It will be now appreciated that striker 92 operates on the inlet valve stem through plate 138. The resiliency of strip 142 insures a good seating force on the inlet valve, while preventing injury to the inlet valve and incomplete closure of the outlet valve. Such an interconnection between the outlet valve and the inlet valve is highly advantageous in systems employing electric ignition of the oil.

Although but one embodiment of the present invention has been illustrated and described, it will be apparent to those skilled in the art that various changes and modifications may be made therein without departing from the spirit of the invention or from the scope of the appended claims.

We claim:

1. A liquid fuel control comprising, a casing having an inlet and an outlet, a valve for the inlet, a valve for the outlet, a float normally regulating the inlet valve to maintain a constant level in the casing, a striker pivotally mounted in the casing, means biasing the striker into contact with the inlet valve to close the inlet valve, means normally retaining the striker out of contact with the inlet valve and responsive to an abnormal level in the casing to release the striker for movement into contact with the inlet valve, said striker being movable in a resetting direction away from the inlet valve for reengagement with said retaining means, toggle acting limit control means for punching the outlet valve closed in response to an abnormal remote temperature, an arm movable with said striker and acting on said toggle means in a resetting direction when the striker is moved in its resetting direction, and another arm projecting from the casing and operatively connected to said striker to move the striker in its resetting direction.

2. A liquid fuel control comprising, a casing having an inlet and an outlet, a valve for the inlet, a valve for the outlet, a float normally regulating inlet valve movement to maintain a constant level in the casing, a striker positioned above the inlet valve, means biasing the striker into contact with the inlet valve to close the inlet valve, means retaining the striker inoperative and responsive to an excessive level in the casing to release the striker, lever means acting on the outlet valve to regulate valve movement, a normally inactive toggle lever adapted to strike said lever means in the valve closing direction when thrown overcenter, means responsive to an abnormal remote temperature to throw the toggle lever overcenter, a reset lever projecting through the casing and adapted to reset said striker in said retaining means when moved in one direction, and means carried on said striker and adapted to reset said toggle lever when said reset lever is moved in said one direction.

3. A liquid fuel flow control comprising a casing having an inlet and an outlet, a valve for the inlet, a valve for the outlet, a float in the casing and normally acting on the inlet valve to maintain a constant level in the casing, a striker pivotally mounted above the inlet valve, means biasing the striker downwardly into valve closing contact with the inlet valve, means retaining the striker inoperative out of contact with the inlet valve against the force of said biasing means and responsive to an excessive liquid level in the casing to release the striker for downward movement, lever means acting on the outlet valve to regulate its movement, said lever means being adapted for normal regulation by manual or thermostatically controlled means, a normally inactive toggle-acting lever adapted to strike said lever means in the valve closing direction when thrown overcenter, means responsive to an abnormal remote temperature to throw said toggle-acting lever overcenter, a reset lever accessible on the exterior of the casing and operatively connected to the striker to move the striker upwardly and to reset the striker in said retaining means when the reset lever is moved in one direction, and an arm carried by the striker and adapted to act on said toggle-acting lever and to move the toggle lever in its resetting direction when the reset lever is moved in said one direction.

WILLIAM A. BIERMANN.
ROBERT W. SLOANE.

References Cited in the file of this patent
UNITED STATES PATENTS

| Number | Name | Date |
|---|---|---|
| 2,389,519 | Landon | Nov. 20, 1945 |
| 2,506,937 | Pawelsky et al. | May 9, 1950 |
| 2,547,995 | Biermann et al. | Apr. 10, 1951 |